Patented Dec. 7, 1943

2,335,905

UNITED STATES PATENT OFFICE 2,335,905

PRINTING COMPOSITION FOR FABRICS AND THE RESULTING PRINTED FABRIC

Newell Meade Bigelow and John Elton Cole, Wilmington, Del., assignors to E. I. du Pont de Nemours & Company, Wilmington, Del., a corporation of Delaware No Drawing. Application September 20, 1940, Serial No. 357,554

5 Claims. (Cl. 106—20)

A. The coloring of textiles has in former years been accomplished largely by dyeing, the dyes being applied either from a water bath or, when incorporated in a paste, by a printing roller. Recently there has been developed a process of coloring textiles which operates to color cloth by applying thereto a lacquer emulsion containing a pigment. The lacquer emulsions are applied in general from printing rollers. The lacquer emulsion process has certain advantages and certain disadvantages with respect to the process of dyeing. Among the main advantages are lower cost of the process and the ability to produce colored patterns of minute fineness and sharp distinction. Among the disadvantages of the process are the tendency of lacquers to stiffen cloth and to obstruct ventilation.

B. In the use of the process it has been an object to use the inexpensive pigments in order to reduce the cost, but one class of the most inexpensive pigments, the sulfur color pigments, have not been found suitable. Heermann, Enzyklopadie der Textilchemischen Technologie, Julius Springer, Berlin, 1930, states: "The sulfur colors are seldom used today in (textile) printing, since the problem of fixing them on the print, even up to now, has not been solved satisfactorily, especially as regards their use in direct printing. They are seldom used in discharge printing, since in general very powerful developers are necessary for this purpose so that the formation of oxy-cellulose can scarcely be avoided." It can still be stated that in general the sulfur colors make poor pigments and that they are not used as pigments in commercial practice. Even the sulfur color lakes, which have somewhat better pigment characteristics than the color pigments, are unsatisfactory in comparison with other types of pigment and are used but little.

C. It is an object of this invention to apply sulfur color pigments to textiles. Another object of the invention is to prepare compositions of matter, containing sulfur color pigments, which are suitable for application to textiles, or to other substances, from printing rollers, particularly compositions which will not corrode printing rollers of brass or copper.

D. The objects of the invention are accomplished, generally speaking, by incorporating in aqueous-organic emulsions containing water and a water-insoluble, film-forming material an oxidized water-insoluble, non-substantive sulfur color pigment substantially free from sulfur, sulfides and inorganic salts, and by applying these emulsions to textile fibers in particular, and to other satisfactory surfaces. The lakes derived from sulfur colors have some utility when applied under these conditions but, contrary to the conditions formerly existing, the lakes are generally of less value than the sulfur color pigments.

E. In general the invention may be said to consist in thoroughly incorporating an aqueous paste or suspension of the sulfur color in its oxidized, colored, non-substantive state with an aqueous solution of a hardening agent, or with a mixture of a heat-hardening organic resin or plastic material, a volatile water-insoluble organic solvent or solvents, an emulsifying agent and if necessary a thickening agent. These ingredients are so selected that the pigment is dispersed evenly and permanently throughout the mass; when applied to textile goods the volatile diluents evaporate, leaving the dye firmly attached to the textile fiber in evenly distributed, very fine, discontinuous spots.

F. The pigments which are used in our invention are sulfur color pigments, of which class the division which is prepared by the thionation of intermediates free from carboxylic and sulfonic acid groups is preferred because it shows less tendency to dissolve in wash water during the purification of the pigment, because it is more readily converted to insoluble aqueous suspensions, and because prints prepared therefrom show less tendency to migrate into unprinted portions and are faster to laundering.

G. The film forming materials, which are used in the emulsion, may be natural or artificial resins and drying oils, preferably those which are resistant to that degree of heat which is undergone in laundering and ironing. Examples of such compounds are linseed oil, the cellulose ethers such as ethyl cellulose, the cellulose esters such as cellulose nitrate and acetate, resins such as phenol formaldehyde, coumarin, urea formaldehyde, and polybasic acid polyhydric alcohol types. Other satisfactory members of the class of water-insoluble film-forming materials are found listed in the examples.

H. In the composition it is sometimes desirable to include plasticizers in order to give the film-forming material flexibility and softness, and driers to speed up the drying rate thereof. The plasticizers selected are those known in the prior art to be efficient in combination with the particular film-forming material involved.

I. In the preferred form of the invention the film-forming portion of the composition contains two elements, one of which is a film-forming material which is hardened by heat, examples of which are oil-modified glyptal resins, urea formaldehyde resins, coumarin, and phenol formaldehyde resins, and the other of which is not heat hardening but has high bonding capacity, such as drying oils, ethyl cellulose and pyroxylin.

J. In order to prepare the sulfur color for incorporation in the composition, the crude sulfur color, or lake derived therefrom, is freed from sulfur and inorganic sulfides and largely freed from other inorganic salts. A satisfactory method of removing sulfur and sulfides from the sulfur color also converts it to its oxidized form and involves passing a current of air through a warm alkaline aqueous suspension of the color, whereby free sulphur and inorganic sulfides are converted to thiosulfates and the color is simultaneously oxidized. By filtering the aqueous suspension and washing it thoroughly with water, a sulfur color pigment is obtained which is free from these undesirable impurities. Another method is to digest the dye with sodium bisulfite or sodium sulfite, filter, wash, suspend in water and oxidize with atmospheric oxygen or with an agent such as hydrogen peroxide, sodium perborate or sodium hypochlorite. If the oxidizing agents produce inorganic salts, they must subsequently be removed by washing. Another satisfactory method of removing sulfur and sulfides from the pigments is to digest the crude dye with sodium hydroxide in excess, to convert the sulfur to sulfide and thiosulfate, acidify the mass, filter, and wash, proceeding with oxidation as above described.

K. In a preferred method of making the lacquer the pigment is suspended in water and the suspension is mixed with a composition containing in emulsion water, a water-insoluble volatile liquid or liquids, a heat hardening resin, another binding agent or agents, and such plasticizers, driers, and emulsifying agents as are desirable. By proper choice of binders, emulsifying agents, and mechanical operation one may produce at will either an emulsion in which the aqueous phase is dispersed in the organic solvent or an emulsion in which the organic solvent is dispersed in the aqueous phase. It is generally assumed that in such emulsions the pigment is concentrated at the interfaces of the two phases, but this has not been demonstrated conclusively and the merit of the invention does not rest on this point. The water-immiscible organic liquid is exemplified by benzene, toluene, xylene, solvent naphtha, alkyl acetates, aliphatic alcohols or mineral oils such as gasoline, mineral spirits or kerosene.

L. A minor method producing inferior results is to form an aqueous suspension of the pigment and incorporate it with an aqueous solution of a water-soluble binding agent which hardens and becomes water-insoluble when treated with hardening agents and dried. In this method a one-phase aqueous suspension of the pigment is obtained. A suitable binding agent for this type of paste is casein dissolved in ammonia and a suitable hardening agent is formaldehyde or a chemical compound which liberates formaldehyde when heated.

M. The principles of the invention, and other objects thereof, will be found in the following examples which are illustrative and not limitative. In the examples all parts are by weight.

EXAMPLE I

*The preparation of a lacquer printing emulsion from a black sulfur color; water-in-lacquer type*

A sample of the black sulfur dye obtained by the thionation of 4-hydroxy-phenyl-beta-naphthylamine, as described in U. S. P. 1,944,250 was suspended in water. The suspension was made alkaline to Clayton Yellow test paper with sodium hydroxide and warmed to 75° C. A finely divided current of air was passed through the suspension until the dye was completely precipitated in its oxidized, non-substantive form. The completion of this process was determined by placing drops of the suspension on absorbent paper. The oxidation was considered complete when the "outspread" of liquid from the center of the drop was colorless or almost so. Then the suspension was filtered; the filter cake was washed with hot water until it was essentially free of sodium hydroxide and other inorganic salts. The moist filter cake was held in this form for incorporation in the printing paste.

Ten parts of a water-insoluble urea-formaldehyde resin dissolved in a mixture of xylene and butanol, representing 5.0 parts of the resin in 2.0 parts of xylene and 3.0 parts of butanol was mixed with 7.5 parts of a 37% castor oil-modified alkyd resin dissolved in 7.5 parts of xylene. This mixture was in turn stirred into 37 parts of a commercial aliphatic hydrocarbon solvent mixture with a boiling range of 145–210° C.

Twenty parts of the black sulfur color pigment, the preparation of which is described above (consisting of 4.0 parts of dry pigment and 16.0 parts of water), 40 parts of water and 1 part of bentonite clay were stirred together and added to the lacquer phase. The entire mixture was then passed repeatedly through a colloid mill until it was well homogenized, forming a stable water-in-oil emulsion.

The thick emulsion thus obtained was printed on cotton goods from an engraved copper roll in the usual manner. The printed goods were dried by passage over a heated metal cylinder. The printed portions of the goods were colored a deep black. The color applied in this manner was equal in tinctorial strength to an orthodox dyeing of the same dye; the fastness of the prints to laundering and to bleaching agents was superior to dyeings of the same dye applied to cotton from a sulfide bath. The roll from which the prints were made was not darkened or otherwise damaged by contact with the printing paste.

EXAMPLE II

*The preparation of a printing lacquer from a blue sulfur color; water-in-lacquer type*

An aqueous suspension of "Sulfogene" Direct Blue BN (color index No. 956) was digested with a dilute solution of sodium hydroxide until all of the free sulfur originally present in the crude dye had been converted to sodium sulfide. Then the mixture was chilled to 5° C. and neutralized with hydrochloric acid at this temperature. The precipitated dye was filtered and washed with water until it was essentially free of inorganic salts. The filter cake was suspended in water and warmed to 70° C.; it then was treated with successive small portions of hydrogen peroxide until a greatly diluted portion of the suspension no longer showed an increase of strength and brightness after each addition.

A urea-formaldehyde-glyptal resin mixture was prepared according to the method described in Example I. To the prepared lacquer resin was added a portion of the oxidized "Sulfogene" Direct Blue BN suspension representing 5.0 parts of dry dye and 25 parts of water. The aqueous phase was dispersed in the organic phase by vigorous milling.

This paste, printed on cotton from an engraved roll, gave a sharply defined blue printed design. The printed portions were similar in shade and strength to an equal concentration of "Sulfogene" Direct Blue BN applied to cotton from a sulfide bath. The fastness of the prints to laundering and bleaching agents was superior to those of ordinary dyeings of the same dye. The printing rolls were not tarnished by contact with the printing paste.

EXAMPLE III

*Preparation of a lacquer emulsion from a blue sulfur color; water-in-lacquer type*

An aqueous press cake of "Sulfogene" Navy Blue GL (color index No. 959) representing 10 parts of dry color was suspended in 150 parts of water at 80° C. and made alkaline to Clayton Yellow paper with sodium hydroxide solution. Air was blown through the mixture at this temperature until all of the dye had been converted to its insoluble, non-substantive form. The spot test on filter paper described in Example I was used to determine the end-point. Then the product was filtered; the filter cake was washed with water until it was free of alkali, and was held as a moist paste until used.

Thirty-seven and one-half parts of a 40% solution (in xylene) of an interpolymer of ethyl methacrylate and China-wood oil prepared in the usual manner and consisting of 8.4 parts of ethyl methacrylate to 6.6 parts of China-wood oil, and 22.5 parts of xylene was mixed with 20 parts of an aqueous paste of "Sulfogene" Navy Blue GL representing 4.0 parts of dry pigment and 16 parts of water. The aqueous paste was dispersed in the lacquer by means of high speed agitation. 35 parts of an aliphatic hydrocarbon solvent mixture with a boiling range of 145° to 216° C. and 57.5 parts of water were added and the mixture was emulsified using a high speed homogenizer.

Cotton goods printed with this paste from an engraved copper roll in the usual manner were colored a deep, full blue. The fastness of the prints to laundering and to bleaching agents was superior to those of a dyeing of "Sulfogene" Navy Blue GL prepared in the orthodox manner. The other fastness properties were similar.

The printing paste did not darken or otherwise damage the printing rolls.

EXAMPLE IV

*The preparation of a lacquer printing emulsion from a lake derived from a blue sulfur dye; water-in-lacquer type*

A portion of "Sulfogene" Navy Blue 4RCF (color index No. 959) representing 5 parts of pure dry dye was suspended in 15 parts of water. To this was added 10 parts of crystalline sodium sulfide. The mixture was warmed to 80° and held at this temperature until the dye was thoroughly wetted; then it was diluted with 75 parts of water and agitated at 90° for 20 minutes.

Next a hot 10% aqueous solution of barium hydroxide was added in small portions. Between each addition, a drop of the reaction mixture was placed on filter paper. If the outspread of the water from the center of the spot was colored, another portion of the barium hydroxide solution was added. When the outspread was colorless, indicating that the sulfur dye was completely precipitated in the form of its barium salt, the addition of barium hydroxide was stopped. The suspension was filtered and washed thoroughly with hot water. Then the filter cake was suspended in 100 parts of hot water; the solution was made slightly alkaline with sodium carbonate and a current of air was blown through it until the color of the suspension no longer increased in depth and brightness. The resulting suspension was again filtered and washed thoroughly with hot water. The press cake was then adjusted to 20% solids content.

Twenty parts of this paste containing 4 parts of the dry barium salt of this color and 16.0 parts of water were incorporated with 37.5 parts of the 40% solution of the interpolymer described in Example III and made up to a suitable printing emulsion as described in Example III.

Cotton goods were printed with this emulsion from an engraved roll in the usual manner. The printed portions of the goods were colored a deep blue shade. The fastness of the prints to laundering and to bleaching agents was good. The printing rolls were not darkened or etched by contact with the printing emulsion.

EXAMPLE V

*The preparation of an emulsion suitable for padding or printing from a green sulfur color; lacquer-in-water type*

A portion of the green sulfur color prepared by the thionation of 1-anilino-4-(p-hydroxy-anilino)-naphthalene, prepared as described in U. S. P. 1,944,250 and representing 3.0 parts of pure dye was suspended in 100 parts of hot water. Five parts of sodium sulfite were added, and the mixture was agitated at or near the boil for two hours. Then the mixture was filtered and washed thoroughly with hot water. The moist press cake was suspended in 50 parts of hot water and an aqueous solution of hydrogen peroxide was added in small portions until the depth and intensity of the color no longer increased. The oxidized dye then was filtered out, washed and held as a moist cake.

Fifty parts of a 40% xylene solution of an ethyl-methacrylate - China - wood oil interpolymer, prepared as in Example III, was mixed intimately with 150 parts of xylene and 10 parts of a 20% aqueous paste of the above green pigment. The mixture was passed several times through a colloid mill.

Fifty parts of the above lacquer and 8.0 parts of octyl alcohol were mixed with 140 parts of water in which one part of sodium lauryl sulfate had previously been dissolved and emulsified by means of high speed agitation. The resulting emulsion was of the lacquer-in-water type.

A sample of cotton piece goods was immersed in the emulsion, then removed and freed of the excess emulsion by wringing. When the impregnated cloth was dried, the dye remained tightly affixed to its surface, coloring it a bright green. The cloth remained soft and flexible. The fastness properties of the dye, applied to the cloth in this manner were equal or superior to those of dyeings of the same dye applied from a sulfide bath.

Example VI

*The preparation of a lacquer emulsion from a brown sulfur dye; lacquer-in-water type*

A portion of the brown sulfur color, which is prepared by the thionation of p-hydroxy-diphenylamine as described in U. S. P. 2,156,071, was suspended in hot water; the suspension was made alkaline to Clayton Yellow test paper with sodium hydroxide and aerated until all of the color had been precipitated in its oxidized, water-insoluble form. The color paste was filtered off, washed with hot water until it was essentially free of inorganic salt, and held in paste form.

A portion of this aqueous paste was incorporated in a lacquer-in-water emulsion composed of an ethyl-methacrylate-China-wood oil interpolymer, xylene, octyl alcohol and water prepared as described in the preceding example. Cotton goods were impregnated in the resulting emulsion, freed of the excess by wringing and dried. They were colored a deep brown, similar in shade and strength to an equally concentrated dyeing of the same dye applied from a sulfide bath. The padded lacquer dyeing was superior in its fastness to laundering and bleaching agents to the regular dyeing. The cloth was not stiffened or hardened appreciably by this treatment.

Example VII

*The preparation of a printing emulsion from a brown sulfur dye; lacquer-in-water type*

A sample of the brown sulfur dye prepared by the thionation of 2:7-diamino-3:6-dimethyl-acridine according to the directions given in U. S. P. 1,165,531 was converted to its water-insoluble, oxidized form according to one of the methods given in the previous examples.

Fifty parts of a 40% solution of an ethyl-methacrylate-China-wood oil interpolymer, prepared as in Example III, was mixed intimately with 100 parts of xylene, 50 parts of mineral spirits and 15 parts of a 20% aqueous paste of the brown pigment, the preparation of which has just been described. The resulting mixture was homogenized thoroughly by means of high-speed agitation.

Fifty parts of the above lacquer and 8.0 parts of octyl alcohol were mixed with 150 parts of water in which one part of sodium lauryl sulfonate had previously been dissolved. The mixture was thoroughly incorporated by colloid milling. The resulting emulsion was of the lacquer-in-water type.

A sample of cotton piece goods was printed with the above emulsion from an engraved copper roll in the usual manner. The printed goods were dried by passage over a hot can. The printed portions of the goods were dyed a deep brown, equal in strength and shade to a dyeing of equal concentration of the same dye applied to cotton in the usual manner from a sulfide bath. The fastness of the printed color to laundering and bleaching agents was superior to those of the orthodox dyeings.

Example VIII

*The preparation of a brown printing emulsion from a lake derived from a brown sulfur color; water-in-lacquer type*

Ten parts of the crude thionation product of 2:7-diamino-3:6-dimethyl-acridine, prepared as described in U. S. P. 1,165,531, was mixed with 20 parts of hot water. Ten parts of crystalline sodium sulfide was added, and the mixture was heated until the sodium sulfide had gone into solution. Then the suspension was diluted to a total volume of 200 parts and was agitated at a temperature of 75° C. until the dye had completely dissolved. This solution was filtered. The filtrate was warmed again to 75° and treated with small portions of a 10% solution of barium hydroxide in hot water until a drop of the suspension, placed on filter paper, left a dark brown spot of solid material surrounded by a colorless or faintly brown outspread. Then the hot suspension was filtered; the filter cake was washed well with hot water. The filter cake then was suspended again in 150 parts of water and warmed to 75°. One part of a 3% solution of hydrogen peroxide was added to the suspension. A small quantity of the suspension was diluted with 500 times its volume of freshly boiled water; this diluted sample was held for reference. The addition of hydrogen peroxide was continued in this manner until the color of the diluted samples no longer showed an increase in strength. The suspension then was filtered and blown as dry as possible.

A solution of a urea-formaldehyde resin in a mixture of xylene and butanol, representing 5.0 parts of the resin in 2.0 parts of xylene and 3.0 parts of butanol, was mixed with 6.0 parts of a 40% blown soya bean oil-modified glyptal resin dissolved in 6 parts of xylene. This lacquer solution was diluted with 37 parts of a hydrocarbon solvent and to this mixture was added 10.0 parts of a 20% paste of the sulfur dye lake, the preparation of which has just been described and 30 parts of water in which was suspended 1 part of a finely divided clay such as bentonite. The mixture was emulsified thoroughly by repeated passage through a colloid mill.

The printing emulsion thus obtained was applied to cotton goods by printing in the usual manner from an engraved roll. The printed portions of the fabric were colored a deep brown, similar in shade to the prints described in Example VII, but deeper and darker in tone than the unlaked dye. The fastness of the prints to light and to the usual testing agents was good. The printing rolls were in no way damaged by contact with the printing emulsion.

Example IX

*The preparation of a printing paste from a yellow sulfur color*

Twenty parts of casein and 150 parts of water were stirred together thoroughly at room temperature for an hour. Then 5 parts of a concentrated aqueous solution of ammonium hydroxide was added, and agitation was continued until solution was complete. Twenty parts of a 20% pulp of "Sulfogene' Yellow G (color index No. 948), which had previously been converted to its oxidized form, was added. The mixture was agitated with a high-speed stirrer until dispersion of the paste was complete; then it was diluted to a total weight of 200 parts with water.

Cotton goods were printed with this paste in the usual manner. The printed goods were aftertreated with a 1% solution of formaldehyde and then dried by passage over a dry can. The goods were printed a bright reddish yellow.

EXAMPLE X

*The preparation of a printing paste from an orange sulfur color*

A sample of the orange sulfur color produced by the thionation of a mixture of meta-toluylene diamine, phthalic anhydride and benzidine according to the method described in U. S. P. 1,981,055 was converted to its water-insoluble, oxidized form according to the method described in earlier examples.

Twenty parts of casein and 150 parts of water were allowed to stand together for one hour. Then 5 parts of concentrated ammonium hydroxide solution were added, and the mixture was agitated until the casein was completely in solution. Five parts of hexamethylene tetramine were added, and the mixture was homogenized by passage through a colloid mill. Then the paste was diluted to a total weight of 200 parts with water.

Cotton goods were printed with this paste in the usual manner. The printed goods were baked on a hot can for 2 minutes at 100°. The printed portions of the goods were colored a fairly bright orange. The fastness of the prints to dry crocking was good; the fastness to laundering, fairly good.

EXAMPLE XI

*The preparation of a printing paste from a Bordeaux sulfur color*

Twenty parts of casein and 150 parts of water were stirred together for one hour. Then 5 parts of concentrated ammonium hydroxide and 20 parts of a 37% dehydrated castor oil modified glyptal resin with an acid number of 113 were added and the whole stirred until a viscous solution was obtained which was diluted with water to a total weight of 200 parts. This mixture was then emulsified with 100 parts of an aliphatic petroleum distillate using 1.5 parts of bentonite as the emulsifying agent. Forty parts of this lacquer were pigmented with ten parts of a 20% paste of "Sulfogene" Bordeaux (color index No. 1012), which had been converted to its oxidized, non-substantive form by one of the methods already described. The mixture was homogenized by passage through a colloid mill.

Cotton goods were printed in the usual manner with this paste. The printed fabric was heated at 100° for one minute, then was allowed to stand overnight to set the pigment. The printed portions of the fabric were colored a Bordeaux, similar in shade and strength to dyeings made with the same dye from a sulfide bath. The fastness of the prints to laundering and to bleaching agents was superior to those of the ordinary dyeings.

EXAMPLE XII

*The preparation of a printing paste from a black sulfur color*

Twenty parts of cellulose acetate of medium viscosity was dissolved in a mixture of 18.5 parts of n-butyl alcohol and 71.5 parts of acetone. To 44 parts of the resulting solution was added 6.0 parts of a 20% paste of the black sulfur color, the preparation of which is described in Example I. The mixture was ground in a ball mill for 24 hours, or until a smooth, well-dispersed emulsion was obtained. Cotton goods were printed in the usual manner with this emulsion. The printed goods were colored a full, strong black.

EXAMPLE XIII

*The preparation of a lacquer emulsion printing paste from a blue sulfur dye*

Twenty parts of linseed oil (containing 5% of cobalt drier) and 20 parts of a 15% aqueous paste of aluminum tristearate were mixed thoroughly by means of high-speed agitation. Ten parts of Solvasol (a hydrocarbon solvent marketed by the Standard Oil Company of New Jersey) was incorporated in the solution. Then 12.0 parts of a 20% aqueous paste of a blue sulfur color lake, prepared as described in Example IV, was added. The resulting mixture was homogenized by means of high-speed agitation. Cotton goods were printed with this paste from an engraved copper roll and dried by passage over a steam-heated metal roll. The printed portions of the goods were dyed a strong, bright blue.

EXAMPLE XIV

*The preparation of a lacquer emulsion printing paste from a brown sulfur color*

Five parts of ethyl cellulose (medium viscosity) were dissolved in 30.0 parts of solvent naphtha. The resulting solution was emulsified in the usual manner with 12 parts of the aqueous paste of the brown sulfur dye described in Example VI, 5.0 parts of a 15% aqueous paste of aluminum tristearate and 48 parts of water. Cotton goods were printed in the usual manner with this paste and dried. The printed portions were dyed a strong brown.

N. All commercially available sulfur colors are useful in the invention in its broadest sense, but in its preferred form those derived from intermediates free from carboxylic and sulfonic acids are preferred.

O. As pigments there may be used in place of the oxidized form of the pigment a sulfur color in reduced form to be oxidized in the print on contact with the air. This is usually less satisfactory than the preferred method because the ultimate shade of the dyeing is not initially determined.

P. Anhydrous lacquers can be prepared and subsequently emulsified with water, but in general the other procedure is preferred. Sulfur color lakes can be used in place of the sulfur color pigments but are generally of less value.

Q. By our invention the trade has been provided with a method of printing textiles with sulfur colors, which are sharp and which under the conditions of our invention are fast. It is particularly to be noted that the fastness of the sulfur colors, when used according to our invention, is superior to that of the same colors applied by other methods.

R. This invention also provides the textile industry with a process for printing with sulfur colors which does not require the use of reducing agents or any subsequent oxidizing of the printed goods. In this way there is eliminated the use of sodium sulfide which is corrosive to materials and poisonous to men, and alternatively eliminates the complicated and unsatisfactory systems of reduction which have been adopted to avoid the use of sodium sulfide. We believe this to be the only process of printing sulfur colors which does not darken, corrode or otherwise deteriorate the engraved rolls which are used in the printing.

S. By our invention it is now possible to print textile fibers of animal origin with sulfur colors, a process which had been impossible in the past because the free alkali required in the reducing bath attacked the animal fibers. Our printing pastes are essentially neutral and can be applied to animal as well as to vegetable fibers.

T. As many apparently widely different embodiments of this invention may be made without departing from the spirit and scope thereof, it is to be understood that we do not limit ourselves to the specific embodiments thereof except as defined in the appended claims.

We claim:

1. A textile having fibers thereof coated with a lacquer of substantially neutral reaction containing an oxidized, water-insoluble, non-substantive sulfur color pigment derived from an intermediate free from sulfonic and carboxylic acid groups, and being substantially free from sulfur, sulfides and inorganic salts.

2. A composition of matter for printing comprising water, a film-forming material, a volatile organic solvent for the film-forming material, a sulfur color pigment derived from an intermediate free from carboxylic and sulfonic acid groups and being in its oxidized water-insoluble, non-substantive form and substantially free from sulfur and sulfides, and containing only minor amounts of inorganic salts.

3. A printing composition, having a continuous lacquer phase, comprising water, a water-insoluble film-forming material, a volatile organic solvent for the film-forming material, a sulfur color pigment derived from an intermediate free from carboxylic and sulfonic acid groups and being in its oxidized, water-insoluble, non-substantive form and substantially free from sulfur and sulfides and containing only minor amounts of inorganic salts, said composition being in an emulsified state.

4. A printing composition, having a continuous water phase, comprising water, a water-insoluble film-forming material, a volatile organic solvent for the film-forming material, a sulfur color pigment derived from an intermediate free from carboxylic and sulfonic acid groups and being in its oxidized water-insoluble, non-substantive form and substantially free from sulfur and sulfides and containing only minor amounts of inorganic salts, said composition being in an emulsified state.

5. A composition for textile printing comprising water, a sulfur color pigment derived from an intermediate free from carboxylic and sulfonic acid groups and being in its oxidized water-insoluble, non-substantive form and substantially free from sulfur and sulfides, and containing only minor amounts of inorganic salts, a film-forming material having one element which is hardened by heat, and another element possessed of high bonding capacity, and a volatile organic solvent for the film-forming material.

NEWELL M. BIGELOW.
JOHN ELTON COLE.